United States Patent
Noumura

(10) Patent No.: US 11,225,227 B2
(45) Date of Patent: Jan. 18, 2022

(54) DRIVING FORCE CONTROL DEVICE

(71) Applicant: TOYOTA JIDOSHA KABUSHIKI KAISHA, Toyota (JP)

(72) Inventor: Shin Noumura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/429,348

(22) Filed: Jun. 3, 2019

(65) Prior Publication Data
US 2020/0023819 A1 Jan. 23, 2020

(30) Foreign Application Priority Data
Jul. 17, 2018 (JP) .............................. JP2018-134345

(51) Int. Cl.
*B60T 7/12* (2006.01)
*G05D 1/00* (2006.01)
*B60W 30/18* (2012.01)
*B60W 10/184* (2012.01)

(52) U.S. Cl.
CPC ............. *B60T 7/12* (2013.01); *B60W 10/184* (2013.01); *B60W 30/18109* (2013.01); *G05D 1/0088* (2013.01)

(58) Field of Classification Search
CPC .. B60T 7/12; G05D 1/0088; B60W 30/18109; B60W 10/184
See application file for complete search history.

(56) References Cited

U.S. PATENT DOCUMENTS

| | | | | |
|---|---|---|---|---|
| 6,212,458 B1 * | 4/2001 | Walenty | ..................... | B60T 7/12 477/15 |
| 7,853,385 B2 * | 12/2010 | Ly | ....................... | F16H 61/0213 701/51 |
| 8,401,753 B2 * | 3/2013 | Chappell | ......... | B60W 30/18009 701/65 |
| 8,939,870 B2 * | 1/2015 | Wurthner | .............. | B60W 10/02 477/186 |
| 2013/0304344 A1 | 11/2013 | Abe | | |

FOREIGN PATENT DOCUMENTS

| | | |
|---|---|---|
| JP | H10-280990 A | 10/1998 |
| JP | 2010-151154 A | 7/2010 |
| JP | 2012-192875 A | 10/2012 |
| WO | 2012/098680 A1 | 7/2012 |

* cited by examiner

Primary Examiner — Ramsey Refai
(74) Attorney, Agent, or Firm — Oliff PLC

(57) ABSTRACT

The driving force control device includes: a requested driving force calculation unit configured to calculate requested driving force requested to the vehicle, in a coasting state where neither an accelerator operation nor a brake operation is performed by a driver; a power train control unit configured to control a gear ratio of the power train on the basis of the requested driving force and driving force that is achieved by the power train in the coasting state; a braking force calculation unit configured to calculate braking force required for achieving the requested driving force, when the requested driving force is smaller than driving force that is achieved by the power train at a gear ratio set by the power train control unit; and a brake control unit configured to cause the brake to generate the braking force calculated by the braking force calculation unit.

8 Claims, 3 Drawing Sheets

DRIVING FORCE CONTROL DEVICE

CROSS REFERENCE TO RELATED APPLICATION

The disclosure of Japanese Patent Application No. 2018-134345, filed on Jul. 17, 2018, is incorporated herein by reference.

BACKGROUND OF THE INVENTION

Field of the Invention

The present invention relates to a driving force control device that controls driving force of a vehicle.

Description of the Background Art

Japanese Laid-Open Patent Publication No. 2012-192875 discloses a driving assistance device that performs constant-speed running control for keeping a vehicle speed constant, when a vehicle is running on a downslope in a state where a brake pedal is in an OFF state and an accelerator opening degree is not greater than a predetermined threshold. In the driving assistance device disclosed in Japanese Laid-Open Patent Publication No. 2012-192875, when tire total braking force calculated on the basis of an engine brake and running resistance is insufficient for requested braking force required to run the vehicle at a set constant speed, discomfort due to gear-shift shock, vibration, or the like is reduced during constant-speed running control by: compensating for the insufficient braking force by using a brake; and limiting gear shifting.

As disclosed in Japanese Laid-Open Patent Publication No. 2012-192875, in the case of generating required braking force by using the brake without downshifting during coasting on a downhill road, if a load on the brake becomes excessively great, there is a possibility that the effect of the brake will be reduced due to fade phenomenon.

SUMMARY OF THE INVENTION

An object of the present invention is to provide a driving force control device that is able to control driving force of a vehicle to an arbitrary value while controlling a load on a brake.

A driving force control device according to an embodiment of the present invention controls driving force of a vehicle including a power train and a brake, and includes: a requested driving force calculation unit configured to calculate requested driving force requested to the vehicle, in a coasting state where neither an accelerator operation nor a brake operation is performed by a driver; a power train control unit configured to control a gear ratio of the power train on the basis of the requested driving force and driving force that is achieved by the power train in the coasting state; a braking force calculation unit configured to calculate braking force required for achieving the requested driving force, when the requested driving force is smaller than driving force that is achieved by the power train at a gear ratio set by the power train control unit; and a brake control unit configured to cause the brake to generate the braking force calculated by the braking force calculation unit.

According to the embodiment of the present invention, it is possible to provide a driving force control device that is able to control driving force of a vehicle to an arbitrary value while controlling a load on a brake These and other objects, features, aspects, and advantages of the present invention will become apparent from the following detailed description of the present invention when taken in conjunction with the accompanying drawings.

DESCRIPTION OF THE PREFERRED EMBODIMENTS

Outline of Embodiment According to Present Invention

Control in which a constant speed is kept through transmission control instead of inhibiting downshifting as in Japanese Laid-Open Patent Publication No. 2012-192875, is also conceivable. However, in a vehicle equipped with a stepped automatic transmission (AT), braking force generated by the AT is discrete, and thus it is difficult to keep a vehicle speed constant through transmission control. In addition, in the case where great braking force is required, there is also a problem in that vibration, noise, etc., are generated by a rise in engine speed, causing a user to feel annoyed.

In a coasting state where neither an accelerator operation nor a brake operation is performed by a driver, a driving force control device according to an embodiment of the present invention increases or decreases driving force, which a power train is caused to generate, so as to follow requested driving force by changing the gear ratio of the power train, and causes a brake to generate braking force to compensate for a shortfall. By cooperatively controlling the gear ratio of the power train and the brake, desired requested driving force can be achieved while a load on the brake is reduced.

The gear ratio of the power train may be settable at a plurality of predetermined levels, and a predetermined first threshold less than driving force that is achieved by the power train and a second threshold that is less than the achieved driving force and greater than the first threshold, may be set for each of the plurality of levels. When the requested driving force has become less than the first threshold, a power train control unit may shift down the level of the gear ratio of the power train by one level, and when the requested driving force has become greater than the second threshold, the power train control unit may shift up the level of the gear ratio of the power train by one level.

With such a configuration, the gear ratio of the power train can be appropriately controlled in accordance with requested driving force.

A requested driving force calculation unit may calculate required driving force on the basis of the deviation between requested acceleration and actual acceleration.

With such a configuration, the responsiveness of control for achieving requested driving force can be improved.

Details of Embodiment

<Configuration>

Figure 1:
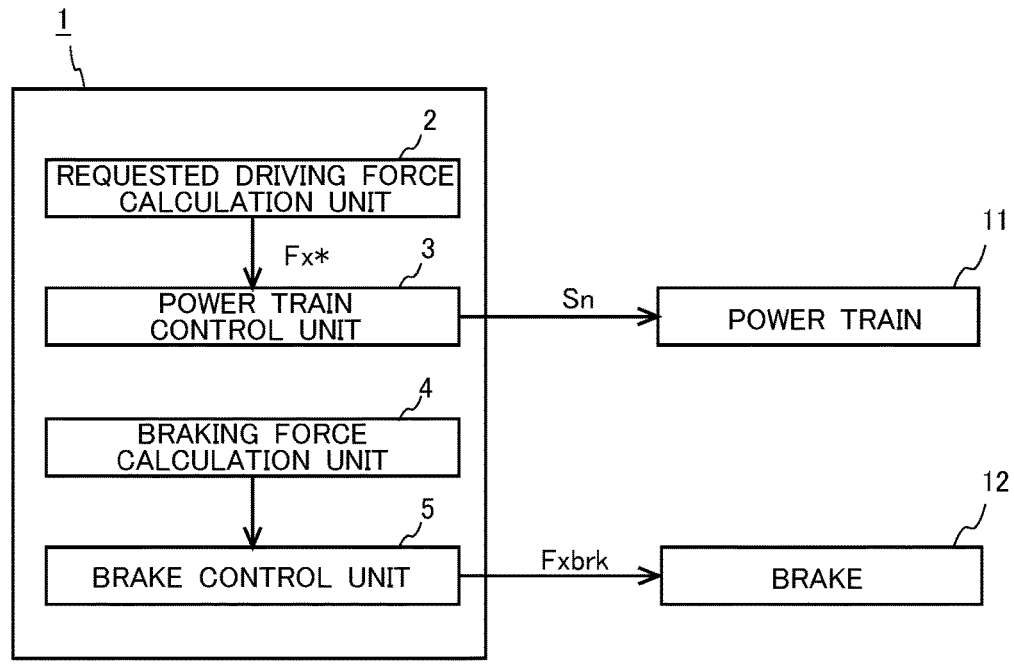
FIG. 1 is a functional block diagram of a driving force control device according to an embodiment.

FIG. 1 is a functional block diagram of the driving force control device according to the embodiment.

The driving force control device 1 is a device for controlling driving force of a vehicle including a power train 11 and a brake 12, and includes a requested driving force calculation unit 2, a power train control unit 3, a braking force calculation unit 4, and a brake control unit 5. The power train 11 is referred to as a drive train in some cases. In the present embodiment, an example in which the power train 11 includes an engine and a stepped automatic transmission (AT) will be described. However, the driving force control device according to the present embodiment can also be applied to the case where, in a vehicle including a continuously variable transmission (CVT) instead of an AT, the CVT is used like a stepped transmission.

When the requested driving force calculation unit 2 detects that a coasting state where neither an accelerator operation nor a brake operation is performed by the driver has occurred, the requested driving force calculation unit 2 calculates requested driving force $Fx^*$ requested to the vehicle. The requested driving force $Fx^*$ can be calculated on the basis of the deviation between requested acceleration $Gx^*$ and actual acceleration $Gx$ that is an actually measured value of acceleration. By calculating the requested driving force $Fx^*$ on the basis of the deviation between the requested acceleration $Gx^*$ and the actual acceleration $Gx$, the responsiveness of driving force control can be improved. Here, the requested acceleration $Gx^*$ may be calculated by the requested driving force calculation unit 2 on the basis of the deviation between a requested speed $Vx^*$ requested from a driving assistance system or the like and an actual speed $Vx$ that is an actually measured value of speed. Alternatively, the requested driving force calculation unit 2 may acquire requested acceleration $Gx^*$ calculated in the driving assistance system or the like.

The power train control unit 3 controls the gear ratio of the power train 11 on the basis of the requested driving force $Fx^*$ calculated by the requested driving force calculation unit 2 and driving force Fxmin that is achieved by the power train 11 in a coasting state. The driving force Fxmin that is achieved by the power train 11 in a coasting state is driving force that is achieved at the present gear ratio (gear stage) when the accelerator is fully closed (the minimum driving force at the present gear ratio). Gear ratio control performed by the power train control unit 3 will be described in detail later.

When the requested driving force $Fx^*$ calculated by the requested driving force calculation unit 2 is less than the driving force Fxmin that is achieved at the present gear ratio when the accelerator is fully closed, the braking force calculation unit 4 calculates brake braking force Fxbrk required for achieving requested driving force. The brake braking force Fxbrk is represented by the following equation. When the driving force of the vehicle is defined as force in the travelling direction of the vehicle, braking force for braking the vehicle is negative driving force. When the requested driving force $Fx^*$ is less than the driving force Fxmin that is achieved at the present gear ratio when the accelerator is fully closed, it is necessary to add braking force (negative driving force) to the driving force Fxmin that is achieved at the present gear ratio when the accelerator is fully closed. Thus, the requested driving force $Fx^*$ is achieved by causing the brake 12 to generate, as the brake braking force Fxbrk, braking force, for a shortfall during coasting running, that cannot be generated by the power train 11.

$$Fxbrk = Fx^* - Fx\min$$

The brake control unit 5 controls the brake 12 to cause the brake 12 to generate the braking force Fxbrk calculated by the braking force calculation unit 4.

Figure 2:
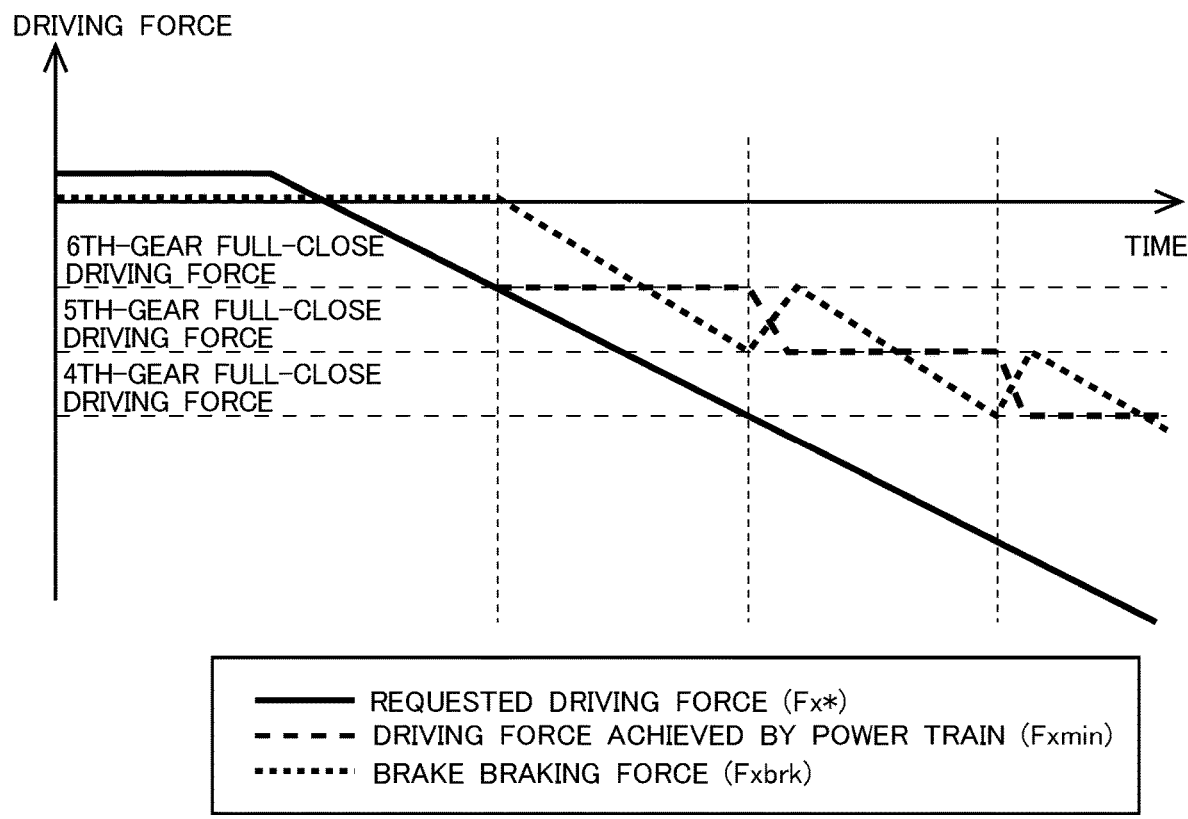
FIG. 2 is a diagram for illustrating an outline of driving force control performed by the driving force control device shown in FIG. 1.

FIG. 2 is a diagram for illustrating an outline of driving force control performed by the driving force control device shown in FIG. 1. In FIG. 2, a thick solid line represents temporal change of the requested driving force $Fx^*$, a thick long-dashes line represents temporal change of the driving force Fxmin that is achieved by the power train 11, and a thick short-dashes line represents temporal change of the brake braking force Fxbrk that the brake 12 is caused to generate. In addition, sixth-gear full-close driving force, fifth-gear full-close driving force, and fourth-gear full-close driving force shown in FIG. 2 correspond to driving force Fxmin that is achieved by the power train 11 at the gear ratio for the sixth gear, at the gear ratio for the fifth gear, and at the gear ratio for the fourth gear, respectively, when the accelerator is fully closed.

The graph of the requested driving force $Fx^*$ in FIG. 2 shows an example in which, after the vehicle enters a downhill road, a coasting state where neither an accelerator operation nor a brake operation is performed occurs, and requested driving force decreases (required braking force increases) over time in order to keep a vehicle speed constant. As the requested driving force $Fx^*$ decreases, the driving force generated by the power train 11 is decreased (braking force is increased), as shown by the thick long-dashes line in FIG. 2, by the power train control unit 3 changing the gear ratio through downshifting. However, the magnitude of driving force that can be achieved through control of the gear ratio of the power train 11 is discrete, and thus it is difficult to achieve the requested driving force only through control of the power train 11 by the power train control unit 3. Therefore, in the present embodiment, by the brake control unit 4 controlling the brake 12 in cooperation with control of the power train 11 by the power train control unit 3, the brake braking force Fxbrk shown by the short-dashes line in FIG. 2 is generated. As a result, requested driving force having an arbitrary value can be generated by the sum of driving force that is achieved by the power train 11 and braking force that is generated by the brake 12.

Control of the gear ratio of the power train 11 by the power train control unit 3 is preferably performed as described below.

In the case where the power train control unit 3 is able to switch the gear ratio stepwise at each of the plurality of gear stages, a first threshold for downshift and a second threshold for upshift are set for a value of requested driving force for each gear stage (gear ratio). The first threshold can be set to, for example, a value that is smaller than the driving force Fxmin, which is achieved by the power train 11 at each gear stage when the accelerator is fully closed, by Fxd. The second threshold is a value that is smaller than the driving force Fxmin, which is achieved by the power train 11 at each gear stage when the accelerator is fully closed, by Fxu and is greater than the first threshold (here, |Fxu|<|Fxd|).

The power train control unit 3 decreases the gear stage of the power train 11 by one stage when the requested driving force $Fx^*$ has changed to a value less than the first threshold for the present gear stage and a state where the requested driving force $Fx^*$ is less than the first threshold for the present gear stage (a state where $Fx^*<Fx\min-Fxd$ is satisfied) has continued for a predetermined time. In addition, the power train control unit 3 increases the gear stage of the power train 11 by one stage when the requested driving force Fx* has changed to a value greater than the second threshold for the present gear stage and a state where the requested driving force Fx* is greater than the second threshold for the present gear stage (a state where Fx*>Fxmin-Fxu is satisfied) has continued for a predetermined time. When downshift is performed on the basis of the first threshold, in a situation where the requested driving force Fx* decreases over time as in running on a downslope, the load on the brake 12 can be reduced by making the most of braking force by transmission control while performing downshift. Moreover, when upshift is performed on the basis of the second threshold, in a situation where the requested driving force Fx* increases over time in order to perform running at a constant speed as in the case where the gradient of a downslope decreases, the gear ratio can be switched in advance before the requested driving force Fx* exceeds the driving force Fxmin, which is achieved at the present gear stage when the accelerator is fully closed, and the driving force becomes insufficient.

<Control Process>

Hereinafter, a control process of the driving force control device according to the present embodiment will be described with reference to FIGS. 1, 3, and 4.

Figure 3:
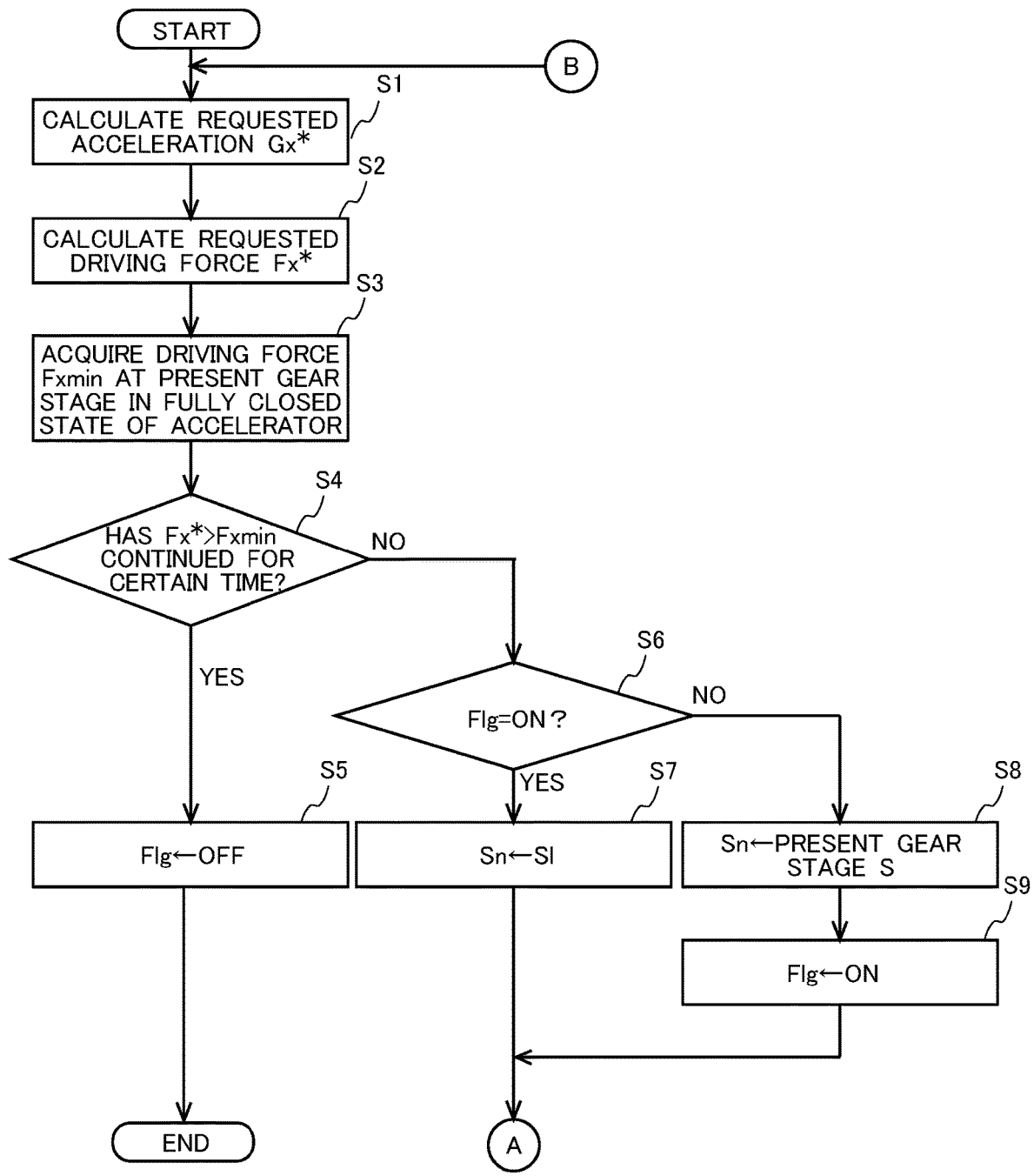
FIG. 3 is a flowchart showing an example of a control process executed by the driving force control device shown in FIG. 1.
Figure 4:
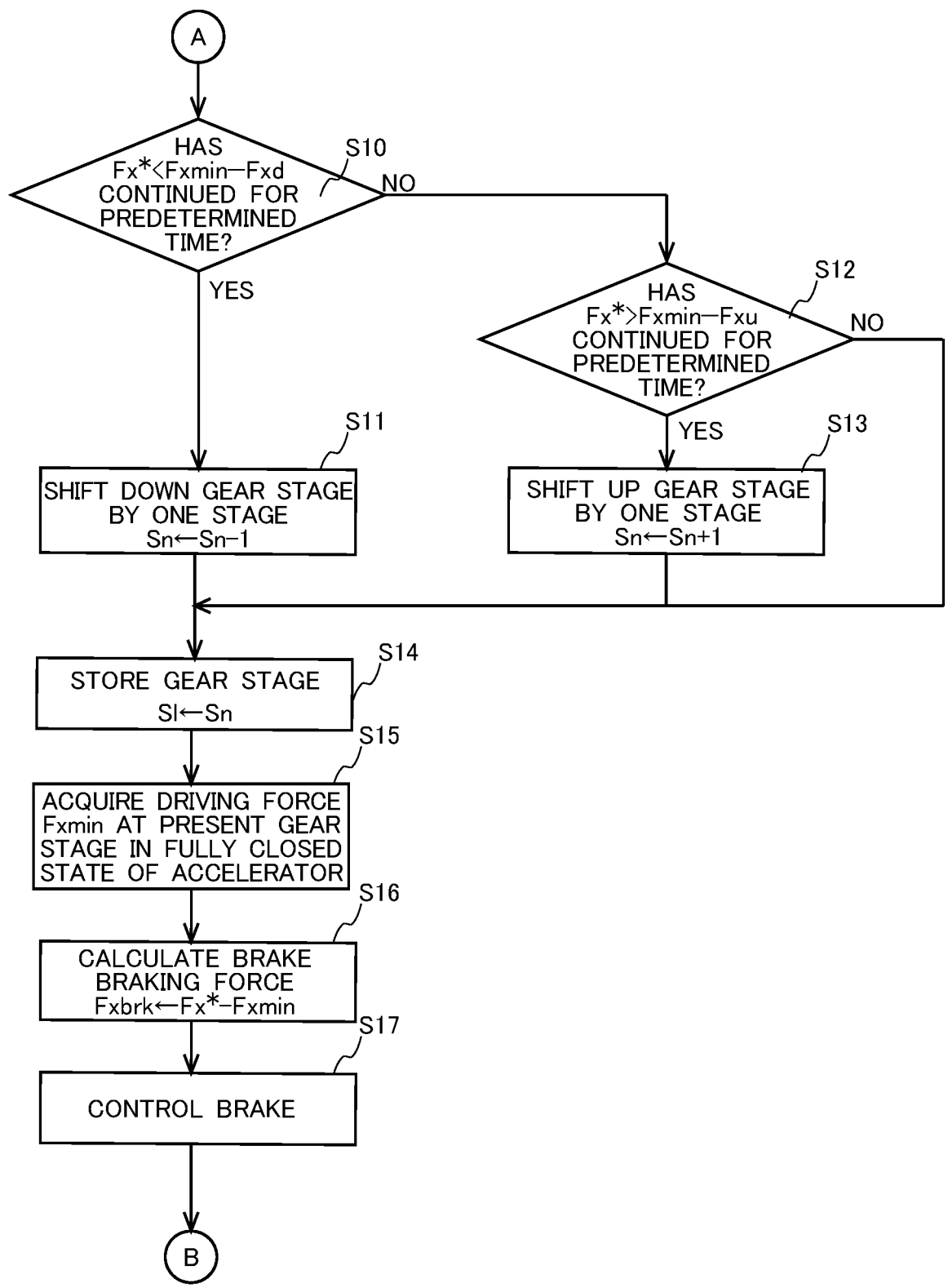
FIG. 4 is a flowchart showing a part of the control process, continued from FIG. 3.

FIGS. 3 and 4 are flowcharts showing an example of the control process executed by the driving force control device shown in FIG. 1. The control process shown in FIGS. 3 and 4 is executed when occurrence of a coasting state where neither an accelerator operation nor a brake operation is performed by the driver is detected.

Step S1: The requested driving force calculation unit 2 calculates the requested acceleration Gx*. As described above, the requested acceleration Gx* can be calculated on the basis of the deviation between the requested speed Vx* requested from the driving assistance system or the like and the actual speed Vx that is an actually measured value of speed. In the case where the requested driving force calculation unit 2 is able to acquire the requested acceleration Gx* from the driving assistance system or the like, the process in step S1 can be omitted. Thereafter, the process proceeds to step S2.

Step S2: The requested driving force calculation unit 2 calculates the requested driving force Fx*. The requested driving force Fx* can be calculated on the basis of the deviation between the requested acceleration Gx* calculated in step S1 and the actual acceleration Gx that is an actually measured value of acceleration. Thereafter, the process proceeds to step S3.

Step S3: The power train control unit 3 acquires the driving force Fxmin that is achieved by the power train 11 at the present gear stage when the accelerator is fully closed. The power train control unit 3 can calculate the driving force Fxmin that is achieved at the present gear stage when the accelerator is fully closed, on the basis of a map, a table, or the like that is prepared in advance, for example.

Step S4: The power train control unit 3 determines whether a state where the requested driving force Fx* is greater than the driving force Fxmin that is achieved at the present gear stage when the accelerator is fully closed has continued for a certain time. The process in step S4 is a step for determining whether to repeat cooperative control of the power train 11 and the brake 12. When the determination in step S4 is YES, the process proceeds to step S5. In the other case, the process proceeds to step S6.

Step S5: The power train control unit 3 sets a flag Flg, which represents whether cooperative control of the power train 11 and the brake 12 is being executed, to be OFF. When the flag Flg is ON, the flag Flg represents cooperative control of the power train 11 and the brake 12 is being executed. Thereafter, the process is ended.

Step S6: The power train control unit 3 determines whether the flag Flg, which represents whether cooperative control of the power train 11 and the brake 12 is being executed, is ON. When the determination in step S6 is YES, the process proceeds to step S7. In the other case, the process proceeds to step S8.

Step S7: The power train control unit 3 sets a gear stage S1 stored after control at the last time, at a parameter Sn that represents a gear stage. When cooperative control of the power train 11 and the brake 12 is being executed, downshift or upshift may be performed in accordance with the value of the requested driving force Fx* through a process in step S11 or S12 described later, so that the gear stage may change from an initial value (a gear stage set in step S8 described later). Therefore, in step S7, the gear stage S1 stored after processes in steps S10 to S13 described later are executed is acquired and set at Sn. Thereafter, the process proceeds to step S10 in FIG. 4.

Step S8: The power train control unit 3 sets the present gear stage S at the parameter Sn, which represents a gear stage. Thereafter, the process proceeds to step S9.

Step S9: The power train control unit 3 sets the flag Flg, which represents whether cooperative control of the power train 11 and the brake 12 is being executed, to be ON. Thereafter, the process proceeds to step S10 in FIG. 4.

Step S10: The power train control unit 3 determines whether a change has been made from a state where the requested driving force Fx* is equal to or greater than the first threshold for downshift (Fxmin-Fxd) that is set for the present gear stage to a state where the requested driving force Fx* is less than the first threshold, and the state where the requested driving force Fx* is less than the first threshold has continued for a predetermined time. The purpose of determining whether the state where the requested driving force Fx* is less than the first threshold has continued for the predetermined time is to eliminate a situation where switching is made frequently in a short time between the state where the requested driving force Fx* is equal to or greater than the first threshold and the state where the requested driving force Fx* is less than the first threshold, and to accurately determine a case where downshift is required. When the determination in step S10 is YES, the process proceeds to step S11. In the other case, the process proceeds to step S12.

Step S11: The power train control unit 3 shifts down the gear stage Sn of the transmission of the power train 11 by one stage (that is, increases the gear ratio). Thereafter, the process proceeds to step S14.

Step S12: The power train control unit 3 determines whether a change has been made from a state where the requested driving force Fx* is equal to or less than the second threshold for upshift (Fxmin−Fxu) that is set for the present gear stage to a state where the requested driving force Fx* is greater than the second threshold, and the state where the requested driving force Fx* is greater than the second threshold has continued for a predetermined time. The purpose of determining whether the state where the requested driving force Fx* is greater than the second threshold has continued for the predetermined time is to eliminate a situation where switching is made frequently in a short time between the state where the requested driving force Fx* is greater than the second threshold and the state where the requested driving force Fx* is equal to or less than the second threshold, and to accurately determine a case where upshift is required. When the determination in step S12 is YES, the process proceeds to step S13. In the other case, the process proceeds to step S14.

Step S13: The power train control unit 3 shifts up the gear stage Sn of the transmission of the power train 11 by one stage (that is, decreases the gear ratio). Thereafter, the process proceeds to step S14.

Step S14: The power train control unit 3 stores a gear stage Sn by setting the gear stage Sn at a parameter S1. Thereafter, the process proceeds to step S15.

Step S15: The power train control unit 3 acquires the driving force Fxmin that is achieved by the power train 11 at the present gear stage when the accelerator is fully closed. Similar to the process in step S3, the power train control unit 3 can calculate the driving force Fxmin that is achieved at the present gear stage when the accelerator is fully closed, on the basis of a map, a table, or the like that is prepared in advance, for example. When it is determined as NO in step S12 and the gear stage has not been changed, the process in step S15 may be omitted. Thereafter, the process proceeds to step S16.

Step S16: The braking force calculation unit 4 calculates the brake braking force Fxbrk, which the brake 12 is caused to generate, on the basis of the requested driving force Fx* and the driving force Fxmin, obtained in step S15, that is achieved by the power train 11 at the present gear stage when the accelerator is fully closed. The brake braking force Fxbrk can be obtained by calculation of (Fx*−Fxmin). Thereafter, the process proceeds to step S17.

Step S17: The brake control unit 5 controls the brake 12 to cause the brake 12 to generate the brake braking force Fxbrk calculated in step S16. Thereafter, the process proceeds to step S1 in FIG. 3.

Advantageous Effects, Etc

In a coasting state where neither an accelerator operation nor a brake operation is performed by the driver, the driving force control device 1 according to the embodiment of the present invention increases or decreases the driving force (braking force) Fxmin, which is generated by the power train 11, so as to follow the requested driving force Fx* by changing the gear ratio of the power train 11, and compensates for sufficient braking force with the brake braking force Fxbrk generated by the brake 12, thereby achieving the requested driving force Fx*. By cooperatively controlling the gear ratio of the power train 11 and the brake 12, the load on the brake 12 can be reduced as compared to that in the case of controlling driving force by solely using the brake 12. In addition, braking force that cannot be achieved only through control of the gear ratio of the power train 11 is compensated for by using the brake 12, and thus gear-shift shock, vibration, etc., can be inhibited when the gear ratio of the power train 11 is changed.

The present invention can be used as a driving force control device that controls driving force of a vehicle.

While the invention has been described in detail, the foregoing description is in all aspects illustrative and not restrictive. It will be understood that numerous other modifications and variations can be devised without departing from the scope of the invention.

What is claimed is:

1. A driving force control device that controls driving force of a vehicle including a power train and a brake, the driving force control device comprising a controller configured to:
receive a requested acceleration from a driving assistance system;
receive a minimum driving force that is achieved by the power train at a current gear ratio;
calculate requested driving force requested to the vehicle, in a coasting state where neither an accelerator operation nor a brake operation is performed by a driver;
control a gear ratio of the power train on the basis of the requested driving force and driving force that is achieved by the power train in the coasting state;
calculate braking force required for achieving the requested driving force, when the requested driving force is smaller than driving force that is achieved by the power train at a gear ratio set by the controller; and
cause the brake to generate the braking force calculated.

2. The driving force control device according to claim 1, wherein
the gear ratio of the power train is settable at a plurality of predetermined levels, and a predetermined first threshold less than driving force that is achieved by the power train and a second threshold that is less than the achieved driving force and greater than the first threshold are set for each of the plurality of levels, and
when the requested driving force has become less than the first threshold, the controller is configured to shift down the level of the gear ratio of the power train by one level, and when the requested driving force has become greater than the second threshold, the controller is configured to shift up the level of the gear ratio of the power train by one level.

3. The driving force control device according to claim 1, wherein the controller is configured to calculate the requested driving force on the basis of a deviation between requested acceleration and actual acceleration.

4. A controller equipped in a vehicle, the controller being configured to:
receive an acceleration from a driving assistance system;
receive a minimum driving force that is achieved by a power train at a current gear ratio; and
distribute a driving/braking request to at least one of a power train system that includes the power train and a brake system that includes a brake.

5. A control device equipped in a vehicle, the control device being configured to:
receive a plurality of requested accelerations from a driving assistance system;
receive a minimum driving force that is achieved by a power train at a current gear ratio; and
distribute a driving/braking request to at least one of the power train and a brake.

6. A system comprising:
a controller equipped in a vehicle;
a power train system that includes a power train; and
a brake system that includes a brake, wherein
the controller is configured to:
receive an acceleration from a driving assistance system;
receive a minimum driving force that is achieved by the power train at a current gear ratio; and
distribute a driving/braking request to at least one of the power train and the brake.

7. A control method executed by a controller equipped in a vehicle, comprising:

receiving an acceleration from a driving assistance system;

receiving a minimum driving force that is achieved by a power train at a current gear ratio; and distributing a driving/braking request to at least one of a power train system that includes the power train and a brake system that includes a brake.

8. A vehicle comprising the controller claimed in claim 4.

* * * * *